US012034160B2

(12) United States Patent
Onodera (10) Patent No.: US 12,034,160 B2
(45) Date of Patent: Jul. 9, 2024

(54) NON-AQUEOUS ELECTROLYTE SECONDARY BATTERY (71) Applicant: Seiko Instruments Inc., Chiba (JP)

(72) Inventor: Takashi Onodera, Chiba (JP)

(73) Assignee: SEIKO INSTRUMENTS INC., Chiba (JP)

(*) Notice: Subject to any disclaimer, the term of this patent is extended or adjusted under 35 U.S.C. 154(b) by 154 days.

(21) Appl. No.: 17/477,018

(22) Filed: Sep. 16, 2021

(65) Prior Publication Data
US 2022/0109150 A1 Apr. 7, 2022

(30) Foreign Application Priority Data

Oct. 2, 2020 (JP) .................. 2020-167642

(51) Int. Cl.
H01M 4/505 (2010.01)
H01M 4/02 (2006.01)
(Continued)

(52) U.S. Cl.
CPC .......... *H01M 4/505* (2013.01); *H01M 4/583* (2013.01); *H01M 10/052* (2013.01);
(Continued)

(58) Field of Classification Search
CPC .......... H01M 10/0427; H01M 50/153; H01M 50/109; H01M 50/171
See application file for complete search history.

(56) References Cited

U.S. PATENT DOCUMENTS

| 2015/0207112 A1* | 7/2015 | Sawayama | ........ H01M 10/0569 429/174 |
| 2017/0005334 A1* | 1/2017 | Takaichi | ................ H01M 4/131 |
| 2018/0019500 A1* | 1/2018 | Miura | .................... H01M 4/525 |

FOREIGN PATENT DOCUMENTS

| JP | 2015-159102 A | 3/2015 |
| JP | 2019-160619 A | 9/2019 |

OTHER PUBLICATIONS

Johnson, C. S., et al. "Lithium-manganese oxide electrodes with layered-spinel composite structures xLi2MnO3.(1-x) Li1+yMn2-yO4 (0< x< 1, 0 y 0.33) for lithium batteries." Electrochemistry Communications 7.5 (2005): 528-536. (Year: 2005).*
(Continued)

*Primary Examiner* — Sadie White
*Assistant Examiner* — Kayla Elaine Clary
(74) *Attorney, Agent, or Firm* — Crowell & Moring LLP (57) ABSTRACT According to the present invention, a non-aqueous electrolyte secondary battery includes an accommodation container including a positive electrode can, a gasket, and a negative electrode can, and a power generation element containing an electrolytic solution. The positive electrode can is formed in a bottomed-cylindrical shape having a bottom wall portion and an outer wall portion. The negative electrode can is formed in a topped-cylindrical shape having a top wall portion and an inner wall portion. A portion of the outer wall portion located on a top wall portion side is made as a crimping portion 12b curved with a curvature radius R gradually toward an inner wall portion side as it extends from a bottom wall portion side toward an opening end edge of the outer wall portion. A diameter D of the non-aqueous electrolyte secondary battery is set to 4.6 mm to 5.0 mm. A height H2 of the positive electrode can is set to be in a range of 74% to 79% of a height H1 of the non-aqueous electrolyte secondary battery. The curvature radius R of the crimping portion is set to be in a range of 0.7 mm to 1.1 mm.

2 Claims, 2 Drawing Sheets (51) Int. Cl.
  *H01M 4/583* (2010.01)
  *H01M 10/052* (2010.01)
  *H01M 10/0569* (2010.01)

(52) U.S. Cl.
  CPC .. *H01M 10/0569* (2013.01); *H01M 2004/021* (2013.01); *H01M 2004/027* (2013.01); *H01M 2004/028* (2013.01); *H01M 2300/004* (2013.01)

(56) References Cited

OTHER PUBLICATIONS

Extended European Search Report in Europe Application No. 21196005.9, dated Feb. 11, 2022, 7 pages.

* cited by examiner

NON-AQUEOUS ELECTROLYTE SECONDARY BATTERY

RELATED APPLICATIONS

This application claims priority to Japanese Patent Application No. 2020-167642, filed on Oct. 2, 2020, the entire content of which is incorporated herein by reference.

BACKGROUND OF THE INVENTION

1. Field of the Invention

The present invention relates to a non-aqueous electrolyte secondary battery.

2. Description of the Related Art

A non-aqueous electrolyte secondary battery is a secondary battery that mainly includes a positive electrode and a negative electrode constituting a pair of polarized electrodes, a separator disposed between the positive electrode and the negative electrode, and an electrolytic solution containing a supporting salt and a solvent, in a sealed accommodation container. This type of non-aqueous electrolyte secondary battery has high energy density and is lightweight, and thus is used, for example, in a power source unit of an electronic device, and a power storage unit that absorbs fluctuations in the amount of power generated by a power generation device.

In particular, in a non-aqueous electrolyte secondary battery containing silicon oxide (SiOx) having a carbon-coated surface, as a negative electrode-active material, a high discharge capacity can be obtained. Thus, such a type of non-aqueous electrolyte secondary battery is suitably used as a small coin-type (button-type) non-aqueous electrolyte secondary battery.

It is known that a coin-type non-aqueous electrolyte secondary battery has a high-voltage, a high-energy density, excellent charge and discharge characteristics, a long life-cycle, and high reliability. Therefore, a coin-type non-aqueous electrolyte secondary battery is suitably used as a backup power source, for a semiconductor memory, a backup power source for a clock function, and the like, in various small electronic devices such as mobile phones, PDAs, portable game machines, and digital cameras.

As such a coin-type non-aqueous electrolyte secondary battery, a non-aqueous electrolyte secondary battery is known that can be used while volatilization of the electrolytic solution and water intrusion are suppressed even in a high-temperature environment of, for example, around 80° C. (for example, see Japanese Unexamined Patent Application, First Publication No. 2015-159102 below).

In this non-aqueous electrolyte secondary battery, formation of a gap between a positive electrode can or a negative electrode can, and a gasket is suppressed in a manner such that the outer diameter is set to be in a range of 4 to 12 mm, the height is made to be in a range of 1 to 3 mm, and the curvature radius (R) of the curved surface of the positive electrode can in sealing (in crimping), the shoulder height ((height h2 of the positive electrode can)/(height h1 of the secondary battery)), and the like are defined. Thus, the sealing performance is improved. This makes it possible to suppress the volatilization of the electrolytic solution and the water intrusion into the battery.

In the coin-type non-aqueous electrolyte secondary battery, the smaller the outer diameter, the more easily it is affected by the volatilization of the electrolytic solution in a high-temperature environment and the water intrusion into the battery. In this point, with the further size reduction and thinning of various electronic devices, it is expected that the coin-type non-aqueous electrolyte secondary battery having an outer diameter of about 4 mm to 6 mm will become the mainstream in the future. Thus, it is required to further improve the sealing performance of the battery.

Furthermore, the coin-type non-aqueous electrolyte secondary battery is required to be compatible with reflow mounting in order to improve soldering efficiency during mounting. Even when reflow mounting (reflow soldering) is performed, in order to enable stable charging and discharging during long-term use or long-term storage, it is important to suppress the leakage of the electrolytic solution and continuously secure the electrolytic solution in the battery.

However, when reflow mounting is performed, the non-aqueous electrolyte secondary battery is exposed to a higher temperature environment in which the peak temperature reaches about 260° C., for example. Thus, the internal pressure of the battery may increase, and the shape of the battery may be deformed. Therefore, due to the deformation of the shape of the battery, a gap is likely to be formed between the positive electrode can or the negative electrode can, and the gasket, and this tends to cause the volatilization of the electrolytic solution, water intrusion into the battery, and the like.

Thus, when reflow mounting is assumed even with the non-aqueous electrolyte secondary battery disclosed in Japanese Unexamined Patent Application, First Publication No. 2015-159102 in the related art, the reliability of the battery such as cycle characteristics and long-term storage stability is likely to be deteriorated, and a liquid leakage occurrence rate tends to increase. Thus, there is room for improvement in view of reflow mounting.

SUMMARY OF THE INVENTION

The present invention is made in view of the above-described circumstances, and an object thereof is to provide a small non-aqueous electrolyte secondary battery having excellent liquid leakage resistance even when being exposed to a high-temperature environment, and having excellent cycle characteristics and long-term storage stability.

(1) According to the present invention, a non-aqueous electrolyte secondary battery is provided, including an accommodation container that includes a positive electrode can and a negative electrode can crimped and fixed to the positive electrode can through a gasket, and a power generation element that contains an electrolytic solution and is accommodated in the accommodation container. The positive electrode can is formed in a bottomed-cylindrical shape having a bottom wall portion and an outer wall portion formed along an outer peripheral edge of the bottom wall portion. The negative electrode can is formed in a topped-cylindrical shape having a top wall portion and an inner wall portion which is formed along an outer peripheral edge of the top wall portion and is disposed inside the outer wall portion. A portion of the outer wall portion located on a top wall portion side is made as a crimping portion curved with a curvature radius R gradually toward an inner wall portion side as it extends from a bottom wall portion side toward an opening end edge of the outer wall portion. A diameter D of the non-aqueous electrolyte secondary battery is set to 4.6 mm to 5.0 mm. A height H2 of the positive electrode can is set to be in a range of 74% to 79% of a height H1 of the non-aqueous electrolyte secondary battery. The curvature radius R of the crimping portion is set to be in a range of 0.7 mm to 1.1 mm.

According to the non-aqueous electrolyte secondary battery according to the present invention, the positive electrode can and the negative electrode can are crimped and fixed through the gasket by using the crimping portion of which a so-called shoulder height (H2/H1) is defined in the range of 74% to 79%, and the curvature radius R is defined in the range of 0.7 mm to 1.1 mm. Thus, it is possible to fix the negative electrode can in a state of being firmly pressed while appropriately compressing the gasket.

When the curvature radius R of the crimping portion is smaller than 0.7 mm, the crimping portion is formed concentrated in a region around the opening end of the outer wall portion. In this case, the negative electrode can and the gasket can be strongly pressed toward the bottom wall portion of the positive electrode can, but the force for pressing the negative electrode can and the gasket toward the center of the accommodation container becomes weaker. Thus, a gap is likely to be formed between the positive electrode can or the negative electrode can, and the gasket, and this may cause liquid leakage (including volatilization of the electrolytic solution), water intrusion, and the like. Therefore, it leads to deterioration of cycle characteristics and long-term storage stability.

On the contrary, when the curvature radius R of the crimping portion is greater than 1.1 mm, the crimping portion is formed in a wide region of the outer wall portion. In this case, the force for pressing the negative electrode can and the gasket toward the center of the accommodation container becomes stronger, but the force for pressing the negative electrode can and the gasket toward the bottom wall portion of the positive electrode can becomes weaker. Thus, even in this case, a gap is likely to be formed between the positive electrode can or the negative electrode can, and the gasket, and the same inconvenience as described above occurs.

Further, when the shoulder height (H2/H1) is smaller than 74%, stress concentrates on the opening end side of the inner wall portion of the negative electrode can during crimping (sealing). Therefore, swelling deformation in which the top wall portion of the negative electrode can swells is likely to occur. Therefore, it causes a defective appearance and leads to a defective product.

On the contrary, when the shoulder height (H2/H1) is greater than 79%, it is not possible to apply sufficient stress to the negative electrode can during sealing. Thus, a gap is formed between the positive electrode can or the negative electrode can, and the gasket, and the above-described inconvenience occurs.

On the other hand, in the non-aqueous electrolyte secondary battery according to the present invention, the shoulder height (H2/H1) is set to be in the range of 74% to 79%, and the curvature radius R of the crimping portion is set to be in the range of 0.7 mm to 1.1 mm. Thus, it is possible to obtain a non-aqueous electrolyte secondary battery which is less likely to cause the above-described inconveniences, has excellent liquid leakage resistance, and has excellent cycle characteristics and long-term storage stability. Therefore, even though the diameter D is reduced to about 4 mm (in the range of 4.6 mm to 5.0 mm), it is possible to maintain the liquid leakage resistance. Further, even though the non-aqueous electrolyte secondary battery is used or stored in a high-temperature environment, it is possible to maintain the liquid leakage resistance. Thus, it is possible to obtain an easy-to-use non-aqueous electrolyte secondary battery having improved operation reliability.

(2) The curvature radius R of the crimping portion may be set to be in a range of 0.8 mm to 1.0 mm.

In this case, it is possible to effectively suppress the formation of a gap between the positive electrode can or the negative electrode can, and the gasket, and liquid leakage, water intrusion, or the like occurs further less frequently. Therefore, it is possible to exhibit further excellent liquid leakage resistance, and to stably maintain the battery capacity for a long period of time.

(3) The power generation element may include a positive electrode that is provided on a positive electrode can side and contains spinel-type lithium manganese oxide as a positive electrode-active material, a negative electrode that is provided on a negative electrode can side and contains carbon-coated SiOx (0<x<2) as a negative electrode-active material, and a separator disposed between the positive electrode and the negative electrode. The electrolytic solution may contain a mixed solvent containing ethylene carbonate (EC) and vinylene carbonate (VC) in a glyme-based solvent.

In this case, the electrolytic solution containing the mixed solvent containing ethylene carbonate (EC) and vinylene carbonate (VC) in the glyme-based solvent is combined with a combination of the positive electrode-active material containing a spinel-type lithium manganese oxide and the negative electrode-active material containing a carbon-coated SiOx. Thus, even though the non-aqueous electrolyte secondary battery is heated during reflow mounting (reflow soldering), there is little possibility that the solvent vaporizes. Thus, it is possible to obtain heat resistance for withstanding heating, and to suppress deterioration of the positive electrode, the negative electrode, and the electrolytic solution. Further, since there is little possibility that the solvent vaporizes even though the non-aqueous electrolyte secondary battery is heated during the reflow mounting, it is possible to obtain a non-aqueous electrolyte secondary battery in which there is little possibility that the internal pressure of the accommodation container increases, and the accommodation container is less likely to be deformed.

Thus, it is possible to obtain a non-aqueous electrolyte secondary battery that can be reflow-mounted. In particular, even though the internal pressure increases due to exposure to a high-temperature environment of, for example, 260° C. during reflow mounting, the liquid leakage resistance is excellent as described above, so that it is possible to maintain excellent cycle characteristics and long-term storage stability even after reflow.

According to the present invention, it is possible to provide a small non-aqueous electrolyte secondary battery having excellent liquid leakage resistance even when being exposed to a high-temperature environment, and having excellent cycle characteristics and long-term storage stability.

DETAILED DESCRIPTION OF THE PREFERRED EMBODIMENTS

Hereinafter, an embodiment of a non-aqueous electrolyte secondary battery according to the present invention will be described with reference to the drawings. The non-aqueous electrolyte secondary battery in the present embodiment is a secondary battery configured by accommodating an active material used as a positive electrode or a negative electrode and a separator in an accommodation container.

Figure 1:
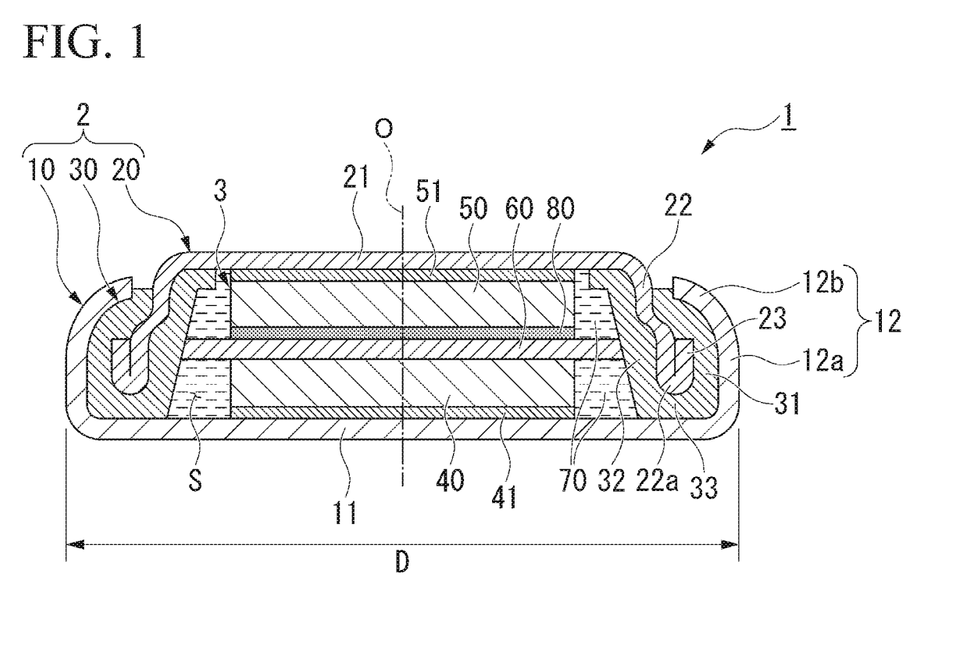
FIG. 1 is a cross-sectional view showing an embodiment of a non-aqueous electrolyte secondary battery according to the present invention.
Figure 2:
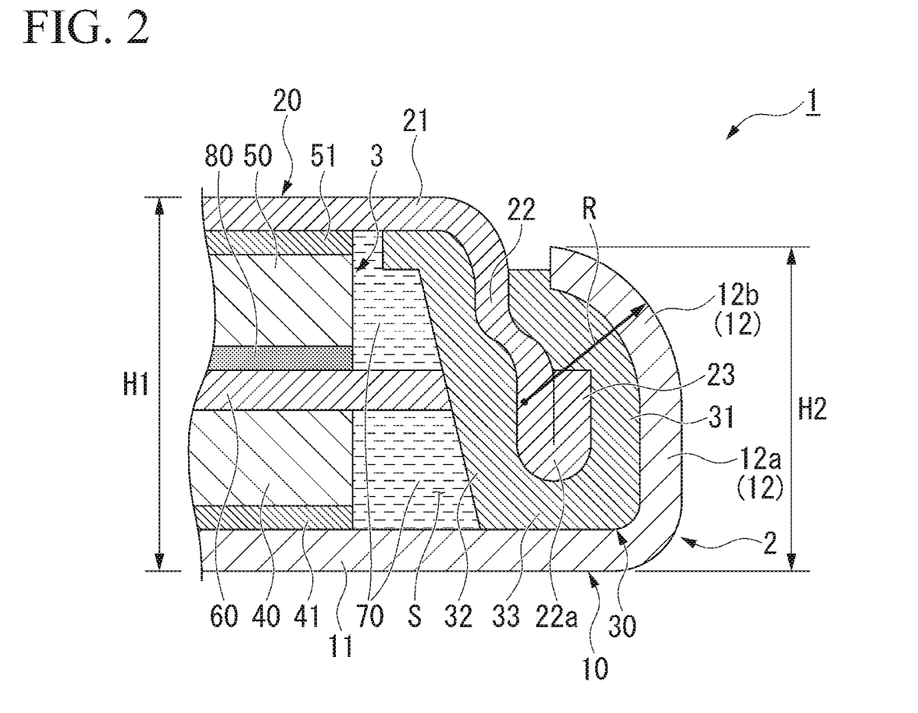
FIG. 2 is an enlarged cross-sectional view of a periphery of a crimping portion shown in FIG. 1.

As shown in FIGS. 1 and 2, a non-aqueous electrolyte secondary battery 1 in the present embodiment is a so-called coin (button) type battery, and mainly includes an accommodation container 2 and a power generation element 3 accommodated in the accommodation container 2.

The accommodation container 2 mainly includes a positive electrode can 10 and a negative electrode can 20 that is crimped and fixed to the positive electrode can 10 through a gasket 30. The positive electrode can 10 and the negative electrode can 20 are fixed so that a bottom wall portion 11 described later of the positive electrode can 10 and a top wall portion 21 described later of the negative electrode can 20 face each other.

In the present embodiment, an axis line that passes through the center of the bottom wall portion 11 and the top wall portion 21 and extends along a direction in which the bottom wall portion 11 and the top wall portion 21 face each other is referred to as a battery axis O. Further, in plan view from the direction of the battery axis O, the direction intersecting the battery axis O is referred to as a radial direction, and a direction rotating around the battery axis O is referred to as a circumferential direction. A direction from the bottom wall portion 11 toward the top wall portion 21 along the battery axis O is referred to as an upward direction, and the opposite direction is referred to as a downward direction.

The power generation element 3 mainly includes a positive electrode 40 provided on the positive electrode can 10 side, a negative electrode 50 provided on the negative electrode can 20 side, and a separator 60 disposed between the positive electrode 40 and the negative electrode 50. The power generation element 3 contains an electrolytic solution 70 and is accommodated in an accommodation space S formed in the accommodation container 2.

(Accommodation Container)

The accommodation container 2 will be described in detail.

The accommodation container 2 mainly includes the metal positive electrode can 10 formed in a bottomed-cylindrical shape and the metal negative electrode can 20 which is formed in a topped-cylindrical shape and crimped and fixed to the positive electrode can 10 through the gasket 30.

The material of the positive electrode can 10 is not limited to a specific material, and examples thereof include SUS316L and SUS329J4L. In addition, known stainless steel in the related art may be used as the material of the positive electrode can 10. A metal material other than stainless steel may be used for the positive electrode can 10.

The material of the negative electrode can 20 is not limited to a specific material, and, for example, SUS316L, SUS329J4L, and the like can be adopted similar to the material of the positive electrode can 10. Other known stainless steel in the related art, such as SUS304-BA, may be adopted as the material of the negative electrode can 20. A metal material other than stainless steel may be used for the negative electrode can 20. For example, a clad material obtained by compressing copper, nickel, or the like to stainless steel may be used for the negative electrode can 20.

(Positive Electrode Can)

The positive electrode can 10 is formed in a bottomed-cylindrical shape having a bottom wall portion 11 and an annular outer wall portion 12. The bottom wall portion 11 is formed in a circular shape in plan view. The outer wall portion 12 is formed at the outer peripheral edge of the bottom wall portion 11 along the circumferential direction of the bottom wall portion 11 and extends upward.

A lower side wall portion 12a connected to the outer peripheral edge of the bottom wall portion 11 of the outer wall portion 12 is a portion having the maximum outer diameter as the non-aqueous electrolyte secondary battery 1. Thus, the outer diameter of the lower side wall portion 12a corresponds to the diameter D of the non-aqueous electrolyte secondary battery 1.

In the present embodiment, the positive electrode can 10 is formed so that the diameter D is set to be in the range of 4.6 mm to 5.0 mm.

An upper side wall portion of the outer wall portion 12 located on the top wall portion side of the negative electrode can 20 is made to be a crimping portion 12b curved with the curvature radius R gradually toward the inside of the radial direction (toward the inner wall portion 22 side of the negative electrode can 20) as it extends from the bottom wall portion 11 side toward an opening end edge of the outer wall portion 12.

In the present embodiment, the crimping portion 12b is formed so that the curvature radius R is set to be in the range of 0.7 mm to 1.1 mm.

In the shown example, the curvature radius of the outer peripheral surface of the crimping portion 12b is set as R. However, the curvature radius of the inner peripheral surface of the crimping portion 12b or the neutral line (not shown) (portion to which neither tensile stress nor compressive stress is applied even though the crimping portion 12b is bent) of the crimping portion 12b may be set as R.

In the stage before crimping, the entirety of the outer wall portion 12 including the crimping portion 12b is formed in a cylindrical shape extending along the battery axis O and opening upward. By applying stress to the crimping portion 12b in sealing (in crimping), the crimping portion 12b is formed to be curved inward in the radial direction with the curvature radius R. The negative electrode can 20 is firmly crimped and fixed through the gasket 30 by crimping with the crimping portion 12b facing inward in the radial direction.

As shown in FIG. 2, the height of the entirety of the outer wall portion 12 along the battery axis O after crimping corresponds to the height H2 of the positive electrode can 10. In the present embodiment, the relationship between the positive electrode can 10 and the negative electrode can 20 is defined so that the height H2 of the positive electrode can 10 is set to be in the range of 74% to 79% of the height H1 of the non-aqueous electrolyte secondary battery 1. This point will be described again later.

(Negative Electrode Can)

As shown in FIGS. 1 and 2, the negative electrode can 20 is formed in a topped-cylindrical shape having a top wall portion 21 and an annular inner wall portion 22. The top wall portion 21 is formed in a circular shape in plan view. The inner wall portion 22 is formed on the outer peripheral edge of the top wall portion 21 along the circumferential direction of the top wall portion 21 and extends downward.

The negative electrode can 20 is integrated with the positive electrode can 10 by being crimped and fixed via the gasket 30 after being combined with the positive electrode can 10 from the top so that the inner wall portion 22 enters the inside of the outer wall portion 12. Thus, the negative electrode can 20 is combined in a state of being accurately positioned with respect to the positive electrode can 10 by the gasket 30.

The top wall portion 21 is disposed above the crimping portion 12b of the outer wall portion 12 of the positive electrode can 10. At this time, the height along the battery axis O between the lower surface of the bottom wall portion 11 of the positive electrode can 10 and the upper surface (top surface) of the top wall portion 21 of the negative electrode can 20 is set to the height H1 of the entirety of the non-aqueous electrolyte secondary battery 1.

In the present embodiment, the positive electrode can 10 and the negative electrode can 20 are combined so that the height H1 of the entirety of the non-aqueous electrolyte secondary battery 1 after crimping is set to be in the range of 1.0 mm to 3.0 mm. At this time, the positive electrode can 10 and the negative electrode can 20 are combined so that the height H2 of the positive electrode can 10 is set to be in the range of 74% to 79% of the height H1 of the non-aqueous electrolyte secondary battery 1.

Any value may be selected as the height H2 of the positive electrode can 10 as long as the so-called shoulder height (H2/H1) is in the range of 74% to 79%.

The inner wall portion 22 is formed to extend downward from the outer peripheral edge of the top wall portion 21. A lower end portion 22a is disposed to be located above the bottom wall portion 11 of the positive electrode can 10 with the gasket 30 interposed therebetween.

In the shown example, the inner wall portion 22 is formed in a two-step cylindrical shape having a diameter which increases from the upper side to the lower side. The inner wall portion is not limited to two steps. For example, the inner wall portion 22 may be formed in a multi-step cylindrical shape in which the diameter is gradually increased by three steps or more from the upper side to the lower side.

Further, in the shown example, the inner wall portion 22 is folded upward from the lower end portion 22a, and an annular folded portion 23 overlapping the inner wall portion 22 from the outside in the radial direction is integrally formed. Thus, a portion in which the outer diameter of the folded portion 23 becomes the maximum outer diameter of the negative electrode can 20 is obtained. The outer diameter of the folded portion 23 is set to be smaller than the inner diameter of the lower side wall portion 12a of the outer wall portion 12. The folded portion 23 is not essential and may not be provided.

In the negative electrode can 20 configured as described above, the crimping portion 12b of the positive electrode can 10 is curved by crimping so as to be located above the folded portion 23. Thus, the negative electrode can 20 is reliably prevented from coming off upward through the gasket 30.

(Gasket)

The gasket 30 is formed in a double annular shape so as to surround the inner wall portion 22 of the negative electrode can 20 from the outer side in the radial direction and the inner side in the radial direction over the entire periphery.

The gasket 30 has an annular outer gasket portion 31 disposed between the outer wall portion 12 of the positive electrode can 10 and the inner wall portion 22 of the negative electrode can 20, and an annular inner gasket portion 32 disposed inside the inner wall portion 22 of the negative electrode can 20. Further, the gasket 30 has an annular flange portion 33 connecting a lower end portion of the outer gasket portion 31 and a lower end portion of the inner gasket portion 32 in the radial direction.

The outer gasket portion 31 is disposed in a predetermined compressed state between the outer wall portion 12 and the inner wall portion 22 by crimping by the crimping portion 12b. The outer gasket portion 31 is tightly fitted to the inner peripheral surface of the outer wall portion 12 and the outer peripheral surface of the inner wall portion 22 without any gap. The flange portion 33 is disposed in a predetermined compressed state between the lower end portion 22a of the inner wall portion 22 and the bottom wall portion 11 by crimping by the crimping portion 12b. The flange portion 33 is tightly fitted to the lower end portion 22a and the bottom wall portion 11 of the inner wall portion 22 without any gap. The inner gasket portion 32 is tightly fitted to the inner peripheral surface of the inner wall portion 22 by crimping by the crimping portion 12b without any gap.

Thus, the gasket 30 is firmly caught between the positive electrode can 10 and the negative electrode can 20 by crimping with the crimping portion 12b. Further, the gasket 30 integrally combines the positive electrode can 10 and the negative electrode can 20 in a state where a sealed accommodation space S is formed between the positive electrode can 10 and the negative electrode can 20.

The accommodation space S is a space surrounded by the bottom wall portion 11 of the positive electrode can 10, the top wall portion 21 of the negative electrode can 20, and the inner gasket portion 32.

The gasket 30 described above is preferably made of, for example, a resin having a thermal deformation temperature of 230° C. or higher. When the thermal deformation temperature of the resin material used for the gasket 30 is 230° C. or higher, it is possible to suppress inconvenience that the gasket 30 is significantly deformed by reflow soldering or heating during use of the non-aqueous electrolyte secondary battery 1, and the electrolytic solution 70 leaks out.

Examples of the material of this type of gasket 30 include polyphenylene sulfide (PPS), polyethylene terephthalate (PET), polyamide, liquid crystal polymer (LCP), tetrafluoroethylene-perfluoroalkyl vinyl ether copolymer resin (PFA), and polyether etherketone resin (PEEK), polyethernitrile resin (PEN), polyetherketone resin (PEK), polyarylate resin, polybutylene terephthalate resin (PBT), polycyclohexanedimethylene terephthalate resin, polyethersulfone resin (PES), polyamino bismaleimide resin, polyetherimide resin, and fluororesin.

Among the above substances, when either PPS or PEEK is used, it is possible to prevent the gasket 30 from being significantly deformed during use or storage in a high-temperature environment, and the sealing performance of the non-aqueous electrolyte secondary battery 1 is further improved. Thus, this is preferable.

Further, a gasket 30 obtained by adding glass fiber, mica whiskers, fine ceramic powder or the like to the above-described material in an addition amount of 30% by mass or less can be preferably used. By using such a material, it is possible to suppress the inconvenience of the gasket 30 being significantly deformed by heating during reflow and the electrolytic solution 70 leaking out.

As described above, the accommodation container 2 configured as described above is configured to satisfy all of the arrangement relationships and dimensional relationships (1) to (3) shown below:

(1) The diameter D of the non-aqueous electrolyte secondary battery 1 is in the range of 4.6 mm to 5.0 mm.

(2) The curvature radius R of the crimping portion 12b in the positive electrode can 10 is in the range of 0.7 mm to 1.1 mm.

(3) The shoulder height (H2/H1), that is, the height H2 of the positive electrode can 10 is in the range of 74% to 79% with respect to the height H1 of the non-aqueous electrolyte secondary battery 1.

The plate thickness of a metal plate used for the positive electrode can 10 and the negative electrode can 20 is generally about 0.1 to 0.3 mm. For example, the average plate thickness of the positive electrode can 10 or the negative electrode can 20 as a whole is set to be about 0.15 mm.

(Power Generation Element)

The power generation element 3 will be described in detail.

As described above, the power generation element 3 mainly includes a positive electrode 40, a negative electrode 50, and a separator 60, and is accommodated together with the electrolytic solution 70 in the accommodation space S in the accommodation container 2.

The positive electrode 40 provided on the positive electrode can 10 side and the negative electrode 50 provided on the negative electrode can 20 side are disposed in the accommodation space S in a state of being opposed to each other in the battery axis O direction through the separator 60. The positive electrode 40, the negative electrode 50, and the separator 60 are impregnated with the electrolytic solution 70 filled in the accommodation container.

The positive electrode 40 is electrically connected to the upper surface of the bottom wall portion 11 of the positive electrode can 10 through a positive electrode current collector 41. On the other hand, the negative electrode 50 is electrically connected to the lower surface of the top wall portion 21 of the negative electrode can 20 through a negative electrode current collector 51.

However, the present invention is not limited to this case. For example, the positive electrode current collector 41 and the negative electrode current collector 51 may be omitted, and the positive electrode 40 may be directly connected to the positive electrode can 10 so that the positive electrode can 10 has a function of a current collector. The negative electrode 50 may be directly connected to the negative electrode can 20 so that the negative electrode can 20 has the function of a current collector.

The separator 60 is held by the gasket 30 in a manner such that the outer peripheral edge of the accommodation container 2 comes into contact with the gasket 30.

(Positive Electrode)

The type of the positive electrode-active material is not particularly limited in the positive electrode 40, but it is preferable to use, for example, a positive electrode-active material containing a spinel-type lithium manganese oxide.

The content of the positive electrode-active material in the positive electrode 40 is determined in consideration of the discharge capacity and the like required for the non-aqueous electrolyte secondary battery 1, and can be, for example, in the range of 50 to 95% by mass. When the content of the positive electrode-active material is equal to or greater than the lower limit value of the above preferable range, a sufficient discharge capacity can be easily obtained. When the content thereof is equal to or smaller than the preferable upper limit value, the positive electrode 40 can be easily molded.

The positive electrode 40 may contain a conductive auxiliary agent (the conductive auxiliary agent used for the positive electrode 40 may be referred to as a "positive electrode conductive auxiliary agent" below).

Examples of the positive electrode conductive auxiliary agent include carbonaceous materials such as furnace black, ketjen black, acetylene black, and graphite.

As the positive electrode conductive auxiliary agent, one of the above may be used alone, or two or more thereof may be used in combination.

The positive electrode 40 may contain a binder (the binder used for the positive electrode 40 may be referred to as a "positive electrode binder" below).

Known substances in the related art can be used as this type of positive electrode binder. For example, polytetrafluoroethylene (PTFE), polyvinylidene fluoride (PVDF), styrene butadiene rubber (SBR), polyacrylic acid (PA), carboxymethyl cellulose (CMC), polyvinyl alcohol (PVA) and the like can be selected, and a binder obtained by combining a plurality of the above materials can be used.

As the positive electrode binder, one of the above types may be used alone, or two or more types may be used in combination. The content of the positive electrode binder in the positive electrode 40 can be, for example, 1 to 20% by mass.

In the present specification, when the upper limit and the lower limit are indicated by using "to" with respect to the numerical range, the range includes the upper limit and the lower limit unless otherwise specified. Thus, for example, when described as 1 to 20% by mass, this means being 1% by mass or greater and 20% by mass or less.

As the positive electrode current collector 41, known current collectors in the related art can be used, and examples thereof can include a conductive resin adhesive using carbon as a conductive filler.

Further, in the present embodiment, the positive electrode-active material may contain other positive electrode-active materials in addition to the above lithium manganese oxide. For example, any one or more of other oxides such as molybdenum oxide, a lithium iron phosphate compound, lithium cobalt oxide, lithium nickel oxide, vanadium oxide may be contained.

(Negative Electrode)

In the negative electrode 50, the type of the negative electrode-active material is not particularly limited, but for example, it is preferable to contain silicon oxide as the negative electrode-active material.

In the negative electrode 50, it is preferable that the negative electrode-active material be a carbon-coated SiOx, for example, a carbon-coated silicon oxide represented by SiOx (0<x<2).

Further, the negative electrode 50 may contain another negative electrode-active material in addition to the above SiOx (0<x<2), as the negative electrode-active material. For example, the negative electrode 50 may contain other negative electrode-active materials such as Si and C.

When granular SiOx (0<x<2) is used as the negative electrode-active material, the particle sizes (D50) are not particularly limited. For example, a range of 0.1 to 30 μm can be selected, and preferably, a range of 1 to 10 μm can be selected.

When the particle size (D50) of SiOx is smaller than the lower limit value of the above range, for example, when the non-aqueous electrolyte secondary battery 1 is stored and used in a harsh high-temperature and high-humidity environment, battery characteristics may be impaired due to increased reactivity due to reflow soldering. Further, when the particle size (D50) of SiOx exceeds the upper limit value of the above range, the discharge rate may decrease.

The content of the negative electrode-active material, that is, SiOx (0<x<2) in the negative electrode 50 is determined in consideration of the discharge capacity required for the non-aqueous electrolyte secondary battery 1. A range of 50% by mass or greater can be selected. Preferably, a range of 60 to 80% by mass is selected.

In the negative electrode 50, when the content of the negative electrode-active material formed of the above elements is equal to or greater than the lower limit value in the above range, a sufficient discharge capacity can be easily obtained. When the content thereof is equal to or smaller than the upper limit value, the negative electrode 50 can be easily molded.

The negative electrode 50 may contain a conductive auxiliary agent (the conductive auxiliary agent used for the negative electrode 50 may be referred to as a "negative electrode conductive auxiliary agent" below). As the negative electrode conductive auxiliary agent, for example, a similar material to the positive electrode conductive auxiliary agent can be adopted.

The negative electrode 50 may contain a binder (the binder used for the negative electrode 50 may be referred to as a "negative electrode binder" below).

As this type of negative electrode binder, for example, polyvinylidene fluoride (PVDF), styrene butadiene rubber (SBR), polyacrylic acid (PA), carboxymethyl cellulose (CMC), polyimide (PI), polyamideimide (PAI) and the like can be selected.

As the negative electrode binder, one of the above types may be used alone, or two or more types may be used in combination.

When polyacrylic acid is used for the negative electrode binder, the pH of polyacrylic acid can be adjusted to about 3 to 10 in advance. In this case, for adjusting the pH, for example, an alkali metal hydroxide such as lithium hydroxide or an alkaline earth metal hydroxide such as magnesium hydroxide can be used.

The content of the negative electrode binder in the negative electrode 50 is set to be, for example, in the range of 1 to 20% by mass.

In the present embodiment, the size and thickness of the negative electrode 50 can be formed in the same manner as the size and thickness of the positive electrode 40.

As shown in the figure, a configuration in which a lithium body 80 such as a lithium foil is provided on the surface of the negative electrode 50, that is, between the negative electrode 50 and the separator 60 can be adopted. The lithium body 80 is not essential and may not be provided.

(Separator)

As the separator 60, an insulating film interposed between the positive electrode 40 and the negative electrode 50, having a large ion transmittance and having mechanical strength is used.

As the separator 60, materials used in the related art for separators of non-aqueous electrolyte secondary batteries can be applied without any limitation. Examples of the separator include non-woven fabric made of glass such as alkali glass, borosilicate glass, quartz glass, and lead glass, and resin such as polyphenylene sulfide (PPS), polyether etherketone (PEEK), polyethylene terephthalate (PET), polyamideimide (PAI), polyamide, and polyimide (PI).

Among the above, as the separator 60, a glass non-woven fabric is preferable, and a borosilicate glass non-woven fabric is more preferable. Since the glass non-woven fabric has excellent mechanical strength and high ion transmittance, it is possible to reduce the internal resistance and improve the discharge capacity.

The thickness of the separator 60 is determined in consideration of the size of the non-aqueous electrolyte secondary battery 1, the material of the separator 60, and the like, and can be, for example, 5 to 300 μm.

(Electrolytic Solution)

The electrolytic solution 70 is usually a liquid in which a supporting salt is dissolved in a non-aqueous solvent.

In the present embodiment, a mixed solvent in which tetraglyme (TEG) is contained as a main solvent, diethoxyethane (DEE) is contained as a sub-solvent, and further ethylene carbonate (EC) and vinylene carbonate (VC) are contained as an additive can be used as the non-aqueous solvent forming the electrolytic solution 70.

The non-aqueous solvent is usually determined in consideration of the heat resistance, viscosity, etc. required for the electrolytic solution 70, but in the present embodiment, the solvent composed of each of the above solvents is used. As the main solvent for forming the glyme-based solvent, tetraglyme, triglyme, pentaglyme, diglyme and the like can be used.

In the present embodiment, an electrolytic solution 70 using a non-aqueous solvent containing tetraglyme (TEG), diethoxyethane (DEE) and ethylene carbonate (EC) can be adopted. By adopting such a configuration, DEE and TEG are solvated with Li ions forming the supporting salt.

At this time, since DEE has a higher donor number than TEG, DEE selectively solvates Li ions. As described above, DEE and TEG are solvated with the Li ions forming the supporting salt to protect the Li ions. Thus, even when water enters the inside of the non-aqueous electrolyte secondary battery 1 in a high-temperature and high-humidity environment, it is possible to prevent the water from reacting with Li, and the discharge capacity is reduced. The effect of suppressing the problem and improving the storage stability can be obtained.

The ratio of each of the above solvents to the non-aqueous solvent in the electrolytic solution 70 is not particularly limited. For example, a range (total 100%) in which TEG: 30% by mass or greater and 48.5% by mass or less (30 to 48.5%), DEE: 30% by mass or greater and 48.5% by mass or less (30 to 48.5%), EC: 0.5% by mass or greater and 10% by mass or less (0.5 to 10%), VC: 2% by mass or greater and 13% by mass or less (2 to 13%) can be selected.

When the ratio of TEG, DEE, and EC contained in the non-aqueous solvent is in the above range, the above-described DEE is solvated with Li ions to obtain an action of protecting Li ions.

Even in the above range, the VC content is preferably in a range of 2.5% by mass or greater and 10% by mass or less (2.5 to 10%), and more preferably in a range of 5.0% by mass or greater and 7.5% by mass or less (5.0 to 7.5%). The upper limit value of the contents of TEG and DEE is preferably 48.25% by mass or less, more preferably 48% by mass or less.

When the VC content is in a range of 2% by mass or greater and 13% by mass or less, even though it is heated during reflow soldering, the change in thickness that occurs in the accommodation container 2 formed by the positive electrode can 10 and the negative electrode can 20 can be reduced, and the increase in the internal resistance can be reduced. Further, when the VC content is in the range of 2.5% by mass or greater and 10.0% by mass or less, even though it is heated during reflow soldering, the change in thickness that occurs in the accommodation container 2 can be reduced furthermore, and the increase in the internal resistance can be furthermore reduced. Even in these ranges, the VC content is most preferably in the range of 5.0% by mass or greater and 7.5% by mass or less.

As the supporting salt, a known Li compound used as a supporting salt can be used in the electrolytic solution of the non-aqueous electrolyte secondary battery. Examples of such a Li compound include lithium salts as follows: organic acid lithium salts such as $LiCH_3SO_3$, $LiCF_3SO_3$, $LiN(CF_3SO_2)_2$, $LiN(C_2F_5SO_2)_2$, $LiC(CF_3SO_2)_3$, $LiN(CF_3SO_3)_2$, and $LiN(FSO_2)_2$; and inorganic acid lithium salts such as $LiPF_6$, $LiBF_4$, $LiB(C_6H_5)_4$, $LiCl$, and $LiBr$.

Among the above substances, lithium salt, which is a compound having lithium ion conductivity, is preferable, and $LiN(CF_3SO_2)_2$, $LiN(FSO_2)_2$, and $LiBF_4$ are more preferable. From the viewpoint that heat resistance and reactivity with water are low, and storage characteristics can be sufficiently improved, $LiN(CF_3SO_2)_2$ is particularly preferable.

As the supporting salt, one of the above substances may be used alone, or two or more thereof may be used in combination.

The content of the supporting salt in the electrolytic solution 70 can be determined in consideration of the type of supporting salt and the like. For example, 0.1 to 3.5 mol/L is preferable, 0.5 to 3 mol/L is more preferable, and 1 to 2.5 mol/L is particularly preferable.

When the supporting salt concentration in the electrolytic solution 70 is too high, or when the supporting salt concentration is too low, the conductivity may also decrease, which may also adversely affect the battery characteristics.

(Action of Non-Aqueous Electrolyte Secondary Battery)

According to the non-aqueous electrolyte secondary battery 1 configured as described above, the electrolytic solution 70 in which the non-aqueous solvent mainly contains tetraglyme (TEG) and diethoxyethane (DEE), and any of ethylene carbonate (EC) and vinylene carbonate (VC) is contained in an appropriate amount range.

Thus, it is possible to obtain heat resistance that can withstand heating during reflow mounting (reflow soldering), and there is little risk of the solvent evaporating even though it is heated by reflow mounting. Thus, it is possible to obtain heat resistance for withstanding heating, and to suppress deterioration of the positive electrode 40, the negative electrode 50, and the electrolytic solution 70. Further, since there is little possibility that the solvent vaporizes even though the non-aqueous electrolyte secondary battery is heated during the reflow mounting, it is possible to obtain a non-aqueous electrolyte secondary battery 1 in which there is little possibility that the internal pressure of the accommodation container 2 increases, and the accommodation container 2 is less likely to be deformed.

When the solvent is a glyme-based solvent mainly containing tetraglyme (TEG) and diethoxyethane (DEE), it is possible to improve the heat resistance of the electrolytic solution 70 due to the high boiling point of these solvents.

From the above description, the non-aqueous electrolyte secondary battery 1 corresponding to reflow mounting can be obtained.

Further, according to the non-aqueous electrolyte secondary battery 1 of the present embodiment, the so-called shoulder height (H2/H1) is defined in the range of 74% to 79%, and the curvature radius R is 0.7 mm to 1.1 mm. The positive electrode can 10 and the negative electrode can 20 are crimped and fixed via the gasket 30 by using the crimping portion 12b defined in the above range. Thus, the negative electrode can 20 can be fixed in a state of being firmly pressed while appropriately compressing the gasket 30.

When a part of the solvent constituting the electrolytic solution 70 is vaporized and the internal pressure of the accommodation container 2 rises due to the non-aqueous electrolyte secondary battery 1 receiving heating corresponding to reflow soldering, the accommodation container 2 may be deformed due to the increase in internal pressure of the accommodation container 2. In this case, the closed structure of the accommodation container 2 may change due to the deformation, and for example, a path for the electrolytic solution 70 to leak to the outside of the accommodation container 2 may be formed.

In this case, when the curvature radius R of the crimping portion 12b is smaller than 0.7 mm, the crimping portion 12b is formed concentrated in the region around the opening end of the outer wall portion 12. In this case, the negative electrode can 20 and the gasket 30 can be strongly pressed toward the bottom wall portion 11 of the positive electrode can 10, but the force for pressing the negative electrode can 20 and the gasket 30 toward the center of the accommodation container 2 becomes weaker.

Thus, a gap is likely to be formed between the positive electrode can 10 or the negative electrode can 20, and the gasket 30, and when heating corresponding to the reflow mounting is applied, a path for the electrolytic solution 70 to leak to the outside of the accommodation container 2 may be formed. Thus, there is a possibility of causing liquid leakage (including volatilization of the electrolytic solution 70), water intrusion, and the like, which leads to deterioration of cycle characteristics and long-term storage stability.

On the contrary, when the curvature radius R of the crimping portion 12b is larger than 1.1 mm, the crimping portion 12b is formed in a wide region of the outer wall portion 12. In this case, the force for pressing the negative electrode can 20 and the gasket 30 toward the center of the accommodation container 2 becomes stronger, but the force for pressing the negative electrode can 20 and the gasket 30 toward the bottom wall portion 11 of the positive electrode can 10 becomes weaker. Thus, even in this case, a gap is likely to occur between the positive electrode can 10 or the negative electrode can 20, and the gasket 30, and the same inconvenience as described above occurs.

Further, when the shoulder height (H2/H1) is smaller than 74%, stress concentrates on the lower end portion 22a side of the inner wall portion 22 of the negative electrode can 20 in sealing (in crimping). Thus, the top wall portion 21 of the negative electrode can 20 is likely to be swollen and deformed so as to swell upward. Therefore, it causes a defective appearance and leads to a defective product.

On the contrary, when the shoulder height (H2/H1) is greater than 79%, it is not possible to apply sufficient stress to the negative electrode can 20 during sealing. Thus, a gap is formed between the positive electrode can 10 or the negative electrode can 20, and the gasket 30, and the above-described inconvenience occurs.

On the other hand, in the non-aqueous electrolyte secondary battery 1 in the present embodiment, the shoulder height (H2/H1) is set to be in the range of 74% to 79%, and the curvature radius R of the crimping portion 12b is set to be in the range of 0.7 mm to 1.1 mm. Thus, it is possible to obtain a non-aqueous electrolyte secondary battery 1 which is less likely to cause the above-described various inconveniences, has excellent liquid leakage resistance, and has excellent cycle characteristics and long-term storage stability.

Thus, even though the diameter D is reduced to about 4 mm (in the range of 4.6 mm to 5.0 mm), it is possible to maintain the liquid leakage resistance. Thus, it is possible to obtain an easy-to-use non-aqueous electrolyte secondary battery 1 having improved operation reliability.

Further, even though the internal pressure increases due to exposure to a high-temperature environment of, for example, 260° C. during reflow mounting, the liquid leakage resistance is excellent as described above, so that it is possible to maintain excellent cycle characteristics and long-term storage stability even after reflow.

Based on the above description, it is possible to obtain a small non-aqueous electrolyte secondary battery 1 that can be reflow-mounted, has excellent liquid leakage resistance even when exposed to a high-temperature environment, and has excellent cycle characteristics and long-term storage stability.

The curvature radius R of the crimping portion 12b is preferably in the range of 0.8 mm to 1.0 mm. In this case, it is possible to effectively suppress the formation of a gap between the positive electrode can 10 or the negative electrode can 20 and the gasket 30, and it is more unlikely that liquid leakage or water intrusion will occur. Therefore, furthermore excellent liquid leakage resistance can be exhibited, and the battery capacity can be stably maintained for a long period of time.

EXAMPLES

Next, regarding the non-aqueous electrolyte secondary battery according to the present invention, examples in which the non-aqueous electrolyte secondary battery 1 having the configurations shown in FIGS. 1 and 2 is actually prototyped, and then an evaluation test described later is performed, and the above-described effects are confirmed will be described below.

In conducting this evaluation test, a non-aqueous electrolyte secondary battery 1 was prototyped with the following requirements.

First, as the positive electrode 40, a commercially available lithium manganese oxide ($Li_{1.14}Co_{0.06}Mn_{1.80}O_4$) is mixed with graphite as a conductive auxiliary agent and polyacrylic acid as a binder in the following ratios to prepare a positive electrode mixture:

Ratio "Lithium manganese oxide:Graphite:Polyacrylic acid=95:4:1 (mass ratio)"

Then, 16.4 mg of the above-described positive electrode mixture was pressurized with a pressing force of 2 ton/cm$^2$ to form a disk-shaped pellet having a diameter of 2.8 mm.

Then, the obtained pellets (positive electrode 40) were adhered to the inner surface of a positive electrode can 10 made of stainless steel (SUS329J4L: thickness t=0.20 mm), by using a conductive resin adhesive containing carbon. A positive electrode unit was obtained by integrating the pellets and the positive electrode can in this manner. Then, this positive electrode unit was heated and dried under reduced pressure in the air under the conditions of 120° C.×11 hours. Then, a sealant was applied to the inner surface of the outer wall portion 12 of the positive electrode can 10 in the positive electrode unit.

As the negative electrode 50, SiO powder in which carbon (C) was formed on the entire surface was prepared, and this was used as the negative electrode-active material. Then, graphite as a conductive agent and polyacrylic acid as a binder were mixed with this negative electrode-active material at the following ratios to prepare a negative electrode mixture:

Ratio "SiO powder:Graphite:Polyacrylic acid=75:20:5 (mass ratio)"

3.1 mg of the above-described negative electrode mixture was pressure-molded at a pressing force of 2 ton/cm$^2$ to form a disk-shaped pellet having a diameter of 2.8 mm.

Then, the obtained pellets (negative electrode 50) were bonded to the inner surface of the negative electrode can 20 made of stainless steel (SUS316L: thickness t=0.20 mm) using a conductive resin adhesive containing carbon as a conductive filler. Then, these were integrated to obtain a negative electrode unit. Then, this negative electrode unit was heated and dried under reduced pressure in the air under the conditions of 160° C.×11 hours. Then, a lithium foil punched to a diameter of 2.8 mm and a thickness of 0.44 mm was crimped onto the pellet-shaped negative electrode 50 to obtain a lithium-negative electrode laminated electrode.

As described above, in this evaluation test, the positive electrode can 10 was provided with the function of the positive electrode current collector 41 and the negative electrode can 20 was provided without providing the positive electrode current collector 41 and the negative electrode current collector 51 shown in the above embodiment. The non-aqueous electrolyte secondary battery 1 was manufactured in a state where the negative electrode current collector 51 had the function of the negative electrode current collector 51. This did not affect the results of this evaluation test.

Then, after drying the non-woven fabric made of glass fiber, it was punched into a disk shape having a diameter of 3.6 mm to obtain a separator 60. Then, the separator 60 was placed on a lithium foil crimped onto the negative electrode 50, and a gasket 30 made of PEEK resin (polyether etherketone resin) was placed in the opening of the negative electrode can 20.

(Preparation of Electrolytic Solution)

As the electrolytic solution 70, each solvent of tetraglyme (TEG), diethoxyethane (DEE), ethylene carbonate (EC) and vinylene carbonate (VC) was mixed to prepare a non-aqueous solvent. LiTFSI (1M) was dissolved as a supporting salt in the obtained non-aqueous solvent to obtain an electrolytic solution 70.

The mixing ratio of each solvent at this time was TEG:DEE:EC:VC=44.8:42.7:5.0:7.5 in terms of capacity ratio.

The positive electrode can 10 and the negative electrode can 20 prepared as described above were filled with a total of 7 μL of the electrolytic solution 70 prepared in the above procedure per battery.

Then, the negative electrode unit was combined with the positive electrode unit so that the separator 60 was in contact with the positive electrode 40, and then the crimping portion 12b of the positive electrode can 10 was crimped to seal the positive electrode can 10 and the negative electrode can 20. Then, the sample battery (non-aqueous electrolyte secondary battery 1) to be evaluated was prepared by allowing it to stand at 25° C. for 7 days.

In producing the sample batteries, as shown in Table 1, seven sample batteries having different radiuses of curvature R of the crimping portion 12b were produced. Specifically, a total of seven sample batteries were prepared so that the curvature radius R was in the range of 0.6 mm to 1.2 mm and differed at intervals of 0.1 mm.

Among the batteries, the 0.7 mm sample battery having a curvature radius R in the range of the present invention (0.7 mm to 1.1 mm) was designated as Example 1, and the 0.8 mm sample battery was designated as Example 2. The 0.9 mm sample battery was designated as Example 3, the 1.0 mm sample battery was designated as Example 4, and a 1.1 mm sample battery was designated as Example 5. Further, the sample battery having a curvature radius R of 0.6 mm, which is outside the range of the present invention, was designated as Comparative Example 1, and the sample battery having a curvature radius R of 1.2 mm was designated as Comparative Example 2.

TABLE 1

|  | Curvature radius R (mm) of crimping portion | Liquid leakage occurrence rate | Initial capacity(mAh) | Capacity retention rate |
|---|---|---|---|---|
| Comparative Example 1 | 0.6 | 5.0% | 1.51 | 48% |
| Example 1 | 0.7 | 0% | 1.50 | 52% |
| Example 2 | 0.8 | 0% | 1.53 | 63% |
| Example 3 | 0.9 | 0% | 1.52 | 67% |
| Example 4 | 1.0 | 0% | 1.49 | 69% |
| Example 5 | 1.1 | 0% | 1.50 | 58% |
| Comparative Example 2 | 1.2 | 1.7% | 1.51 | 52% |

In all of the seven sample batteries described above, the diameter D was set to 4.8 mm, within the range of the present invention (4.6 mm to 5.0 mm), and the battery height H1 was set to 2.1 mm.

Further, in conducting this evaluation test, when the curvature radius R of the crimping portion 12b was 0.9 mm, as shown in Table 2, five sample batteries having different ratios of the so-called shoulder height (H2/H1) were prepared.

Specifically, five sample batteries in total were prepared in the range where the ratio (H2/H1) of the shoulder height was 71% to 81%. Among the sample batteries, the 74% sample battery having the ratio (H2/H1) of the shoulder height which was within the range (74% to 79%) of the present invention was designated as Example 6, and the 76% sample battery was designated as Example 7. The 79% sample battery was designated as Example 8. Further, the 71% sample battery having the ratio (H2/H1) of the shoulder height, which was out of the range of the present invention, was designated as Comparative Example 3, and the 81% sample battery was designated as Comparative Example 4.

TABLE 2

|  | Ratio (%) of shoulder height (H2/H1) | Height H2 (mm) of positive electrode can | Liquid leakage occurrence rate | Occurrence rate of swelling deformation |
|---|---|---|---|---|
| Comparative Example 3 | 71 | 1.50 | 0% | 30% |
| Example 6 | 74 | 1.55 | 0% | 0% |
| Example 7 | 76 | 1.60 | 0% | 0% |
| Example 8 | 79 | 1.65 | 0% | 0% |
| Comparative Example 4 | 81 | 1.70 | 20% | 0% |

(Evaluation Test)

Each of the above-described sample batteries (Examples 1 to 8 and Comparative Examples 1 to 4) was heated under reflow conditions, and the appearance after heating was observed. By performing this observation, it was confirmed whether or not liquid leakage occurred and whether or not the top wall portion 21 of the negative electrode can 20 had swelling deformation.

Further, the battery capacity (initial capacity) immediately after heating was measured, and the battery capacity was measured again after a lapse of a certain period of time to calculate the capacity retention rate.

Specifically, each of the seven sample batteries of Examples 1 to 5 and Comparative Examples 1 and 2 shown in Table 1 was heated at 260° C. for 10 seconds. At this time, 60 sample batteries were prepared and heated. Then, an appearance inspection was performed on all 60 sample batteries, and the number of sample batteries leaking the electrolytic solution 70 from the inside of the batteries was measured to determine the liquid leakage occurrence rate (%).

The heat treatment of heating at 260° C. for 10 seconds corresponds to the heating conditions associated with reflow mounting (reflow soldering).

Figure 3:
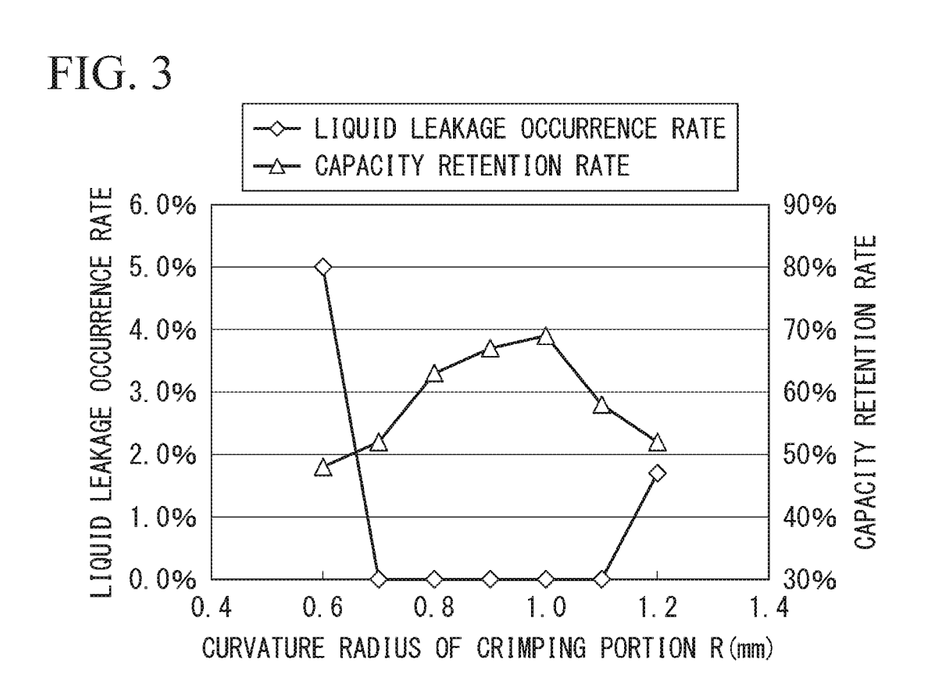
FIG. 3 is a diagram showing a relationship between a curvature radius of the crimping portion, a liquid leakage occurrence rate, and a capacity retention rate.

The results of the measured liquid leakage occurrence rate are shown in Table 1 and FIG. 3. Further, the results of measuring the initial capacity (mAh) after heating are also shown in Table 1 and FIG. 3.

After further heating as described above, each sample battery was stored for 480 hours in a constant temperature bath adjusted to an atmosphere of 80° C. and 90% relative humidity (RH: Relative Humidity), and then the battery capacity was measured again. Then, the capacity retention rate (%) was calculated by comparing the measured capacity with the initial capacity. This makes it possible to confirm the degree of deterioration of the non-aqueous electrolyte secondary battery in a high-temperature and high-humidity environment.

The results of the calculated capacity retention rate are shown in Table 1 and FIG. 3.

Further, each of the five sample batteries of Examples 6 to 8 and Comparative Examples 3 and 4 shown in Table 2 was heated at 260° C. for 10 seconds in the same manner as described above. At this time, 20 sample batteries were prepared and heated. Then, an appearance inspection was performed on all 20 sample batteries to obtain the liquid leakage occurrence rate (%) in the same manner as described above. In addition, the swelling deformation occurrence rate (%) was obtained by visually confirming whether or not swelling deformation had occurred.

Figure 4:
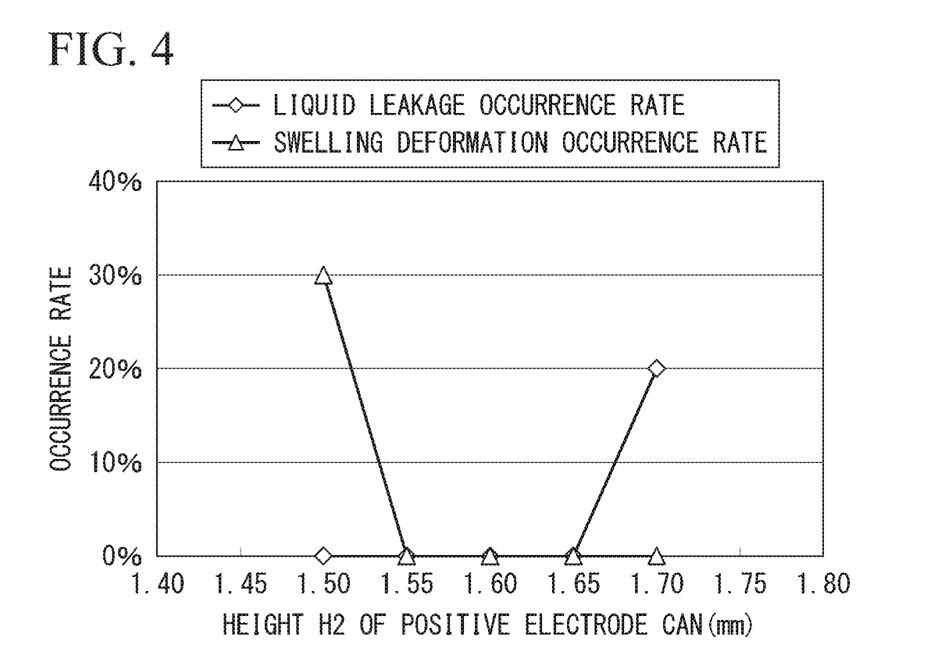
FIG. 4 is a diagram showing relationship between a shoulder height (H2/H1), the liquid leakage occurrence rate, and a swelling deformation occurrence rate.

The results of the measured liquid leakage occurrence rate and swelling deformation occurrence rate are shown in Table 2 and FIG. 4.

As shown in Table 1 and FIG. 3, in the case of the sample batteries of Examples 1 to 5 in which the curvature radius R of the crimping portion 12b was in the range (0.7 mm to 1.1 mm) of the present invention, it was confirmed that no liquid leakage had occurred, and thus the result that the capacity retention rate after storage in a high-temperature and high-humidity environment exceeded 50% was obtained. Thus, it was actually confirmed that the sample batteries of Examples 1 to 5 were non-aqueous electrolyte secondary batteries having excellent liquid leakage resistance, cycle characteristics, and long-term storage stability.

In particular, in the case of the sample batteries of Examples 2 to 4 in which the curvature radius R was in the range of 0.8 mm to 1.0 mm, it was confirmed that the result that the capacity retention rate after storage in a high-temperature and high-humidity environment exceeded 60% was obtained. Thus, it was actually confirmed that a non-aqueous electrolyte secondary battery capable of further maintaining the battery capacity was obtained.

On the other hand, in the case of the sample batteries of Comparative Examples 1 and 2 in which the curvature radius R of the crimping portion 12b was out of the range (0.7 mm to 1.1 mm) of the present invention, it was confirmed that liquid leakage had actually occurred, and thus the capacity retention rate tended to be less than 50%.

Further, as shown in Table 2 and FIG. 4, in the case of the sample batteries of Examples 6 to 8 in which the ratio (H2/H1) of the shoulder height was in the range (74% to 79%) of the present invention, it was confirmed that no liquid leakage had occurred, and no swelling deformation had occurred. Thus, it was actually confirmed that the sample batteries of Examples 6 to 8 were non-aqueous electrolyte secondary batteries having excellent liquid leakage resistance, cycle characteristics, and long-term storage stability.

On the other hand, in the case of the sample batteries of Examples 3 and 4 in which the ratio (H2/H1) of the shoulder height was outside the range (74% to 79%) of the present invention, it was confirmed that liquid leakage and swelling deformation had actually occurred.

Although the embodiment of the present invention has been described above, the embodiment is presented as examples and is not intended to limit the scope of the invention. The embodiment can be implemented in various other forms, and various omissions, replacements, and changes can be made without departing from the gist of the invention. The embodiment and modification examples thereof include, for example, those that can be easily assumed by those skilled in the art, those that are substantially the same, those that have an equal range, and the like.

According to the present invention, it is possible to obtain a small non-aqueous electrolyte secondary battery having excellent liquid leakage resistance even when being exposed to a high-temperature environment, and having excellent cycle characteristics and long-term storage stability. Thus, the present invention has industrial applicability.

What is claimed is:

1. A non-aqueous electrolyte secondary battery, comprising:
    an accommodation container comprising a positive electrode can and a negative electrode can crimped and fixed to the positive electrode can through a gasket; and
    a power generation element comprising an electrolytic solution and is accommodated in the accommodation container,
    wherein the positive electrode can is formed in a bottomed-cylindrical shape having a bottom wall portion and an outer wall portion formed along an outer peripheral edge of the bottom wall portion,
    the negative electrode can is formed in a topped-cylindrical shape having a top wall portion and an inner wall portion which is formed along an outer peripheral edge of the top wall portion and is disposed inside the outer wall portion,
    a portion of the outer wall portion located on a top wall portion side is formed as a crimping portion curved with a curvature radius R gradually toward an inner wall portion side as it extends from a bottom wall portion side toward an opening end edge of the outer wall portion,
    a diameter D of the non-aqueous electrolyte secondary battery is set to 4.8 mm,
    a height H2 of the positive electrode can is set to be in a range of 74% to 79% of a height H1 of the non-aqueous electrolyte secondary battery,
    the height H1 is set to 2.1 mm, and
    the curvature radius R of the crimping portion is set to be in a range of 0.9 mm.

2. The non-aqueous electrolyte secondary battery according to claim 1,
    wherein the power generation element comprises
        a positive electrode that is provided on a positive electrode can side and comprises spinel-type lithium manganese oxide as a positive electrode-active material,
        a negative electrode that is provided on a negative electrode can side and comprises carbon-coated $SiO_x$ ($0<x<2$) as a negative electrode-active material, and
        a separator disposed between the positive electrode and the negative electrode, and
    the electrolytic solution comprises a mixed solvent comprising ethylene carbonate (EC) and vinylene carbonate (VC) in a glyme-based solvent.

* * * * *